Aug. 19, 1924.
W. R. COX
1,505,314
ELECTRICAL GROUNDING CLAMP
Filed Aug. 19, 1920
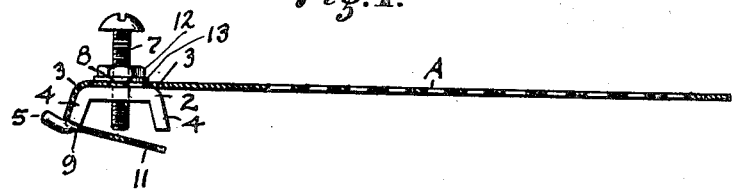
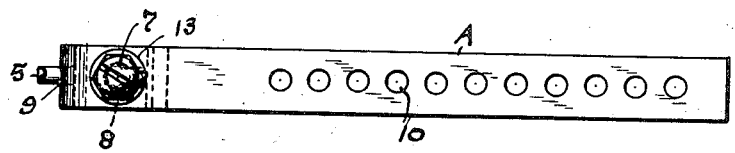
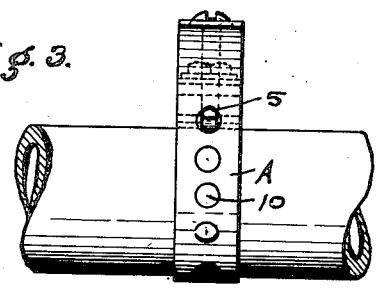
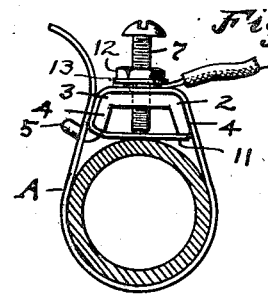
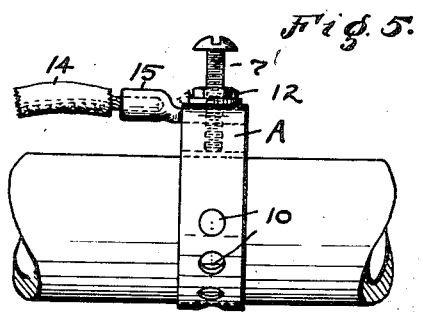
Inventor
Warren R. Cox.
By Fisher & Moat
Attorneys Patented Aug. 19, 1924.

1,505,314

UNITED STATES PATENT OFFICE.

WARREN R. COX, OF CLEVELAND, OHIO.

ELECTRICAL GROUNDING CLAMP.

Application filed August 19, 1920. Serial No. 404,601.

*To all whom it may concern:*

Be it known that I, WARREN R. COX, a citizen of the United States, residing at Cleveland, in the county of Cuyahoga and State of Ohio, have invented certain new and useful Improvements in Electrical Grounding Clamps, of which the following is a specification.

This invention pertains to a grounding clamp or electrical connection adapted to be affixed to a pipe or other conductor in an electric circuit, all substantially as hereinafter shown and described and more particularly pointed out in the claims.

In the accompanying drawings, Fig. 1 is a side elevation and sectional view of the device, with the strap being in section. Fig. 2 is a plan view looking down upon the device shown. Fig. 3 is a side elevation of the device clamped upon a short piece of pipe. Fig. 4 shows a cross section of the pipe and a side elevation of the clamp and its strap in clamping engagement. Fig. 5 is a view of a modified form of clamping device secured upon a piece of pipe, and Fig. 6 is a perspective view of the body or yoke shown in Fig. 5 but without the metallic strap.

The invention comprises a metal yoke or holdfast member 2 having a flat top and rounded corners 3 and slightly flaring flanges or depending sides 4 and one of these side flanges is provided with an integral hook or projection 5 at its bottom edge and the size and proportions of this member 2 are substantially as shown to permit a thin metal strap A to be wrapped therearound. The flat top portion of member 2 has a screw-threaded hole 6 centrally therein to receive a clamping and binding screw 7, and one end portion of the strap is also provided with a pair of slots or openings 8 and 9 to receive screw 7 and the projection 5, respectively. Strap A is further provided with a series of closely spaced openings 10 adapted to permit the free end of the strap to be engaged and hooked upon projection 5 when the device is seated upon a pipe with the strap wrapped around the pipe. Opening 9 is located remotely from one end edge of the strap to permit one extremity 11 to be folded under yoke member 2 in engagement with the bottom edges of its flanges 4, and this portion 11 is adapted to seat upon and conform to the pipe and provide substantial electrical contact therewith while also serving as a bearing part to take the end pressure and rotation of screw 7. In brief, this arrangement is of decided advantage in that the screw is prevented from engaging the pipe directly thereby and preventing the screw from piercing the pipe, especially if the pipe is thin or rusted and weak internally. A nut 12 and washer 13 lock the screw 7 and parts more securely together and provide a binding connection for an electrical wire or conductor 14. However this wire may be attached in any other convenient way. For example, in Figs. 5 and 6 I show member 2 provided with an integral terminal 15 adapted to receive a wire which may be either clamped or soldered therein.

The present device is particularly distinguished from the construction shown and described and claimed in my Letters Patent dated March 6, 1907, No. 846,400, in that the clamping strap is not provided with a lug or catch but is merely a plain perforated strip of metal adapted to be wrapped around the yoke or holdfast member 2. Furthermore, in the present device the opposite ends of the clamping strap are not connected to each other but separately anchored instead to the yoke or holdfast member, which makes a strong and rigid construction and prevents the complete clamp from twisting or turning on the pipe when the screw is tightened. Member 2 may be either pressed or cast from metal and the use of an integral projection or hook 5 on this member places the clamping and pulling strain on an integral part of the main body of the device instead of placing it on a rivet or bent catch affixed to or forming part of the strap as formerly. The depending flanges or sides of main member 2 also provide a space within which the underlying portion of the strap is free to flex or bend to accommodate attachment of the device to pipes of different diameter, and this portion of the strap also serves to guard and protect the pipe from injury in making screw-clamping engagement and being an integral part of the strap it cannot be detached or displaced in installing or transporting the device.

What I claim is:

1. An electrical grounding clamp, comprising a plate having flanges and a projection extending from one of said flanges, a metal strap having perforations at one end and a pair of openings at its opposite end, a clamping screw extending through said plate and one of said pair of openings, and said strap being wrapped around the flanges with said projection protruding through the second opening and with the end of the strap extended beneath the flanges of said plate, the opposite perforated end of said strap being also adapted to be hooked to said projection when wrapped around a pipe.

2. A device for grounding electrical currents, comprising a base member having a screw-threaded hole through its top and depending sides and a lug at one side and a terminal extending from said member, a clamping screw engaged in said hole and projected into the space between said sides, and a strap having one end provided with an opening for said screw and an opening for said lug and wrapped and extending across the bottom edges of said sides and across the top of said base member and its opposite end being perforated and adapted to be wrapped around a pipe and also connected with said lug.

Signed at Cleveland, in the county of Cuyahoga, and State of Ohio, this 16th day of August, 1920.

WARREN R. COX.